US006739538B2

United States Patent
Alexander

(10) Patent No.: US 6,739,538 B2
(45) Date of Patent: May 25, 2004

(54) TAPE REEL ASSEMBLY WITH SELF-ADJUSTING FLANGE FOR A DATA STORAGE TAPE CARTRIDGE

(75) Inventor: Jerry L. Alexander, St. Paul Park, MN (US)

(73) Assignee: Imation Corp., Oakdale, CA (US)

( * ) Notice: Subject to any disclaimer, the term of this patent is extended or adjusted under 35 U.S.C. 154(b) by 8 days.

(21) Appl. No.: 10/132,972

(22) Filed: Apr. 26, 2002

(65) Prior Publication Data

US 2003/0201356 A1 Oct. 30, 2003

(51) Int. Cl.[7] .................. G11B 23/107; B65H 75/14
(52) U.S. Cl. ........................ 242/348; 242/614
(58) Field of Search ................. 242/345, 348, 242/407, 614; 360/132

(56) References Cited

U.S. PATENT DOCUMENTS

| 3,342,435 | A | * | 9/1967 | Gelardi et al. ............ 242/614 |
| 3,892,370 | A | * | 7/1975 | Nelson .................... 242/614 |
| 5,456,423 | A | * | 10/1995 | Sakurai et al. ........... 242/614 |
| 5,474,253 | A | * | 12/1995 | Kasetty et al. ........... 242/614 |
| 5,474,254 | A | * | 12/1995 | Faulkner .................. 242/614 |
| 5,803,388 | A | * | 9/1998 | Saliba et al. ............. 242/348 |
| 6,062,500 | A | * | 5/2000 | Coles ..................... 242/614 |
| 6,450,438 | B1 | * | 9/2002 | McAllister et al. ....... 242/614 |
| 2002/0084379 | A1 | | 7/2002 | Morita |

* cited by examiner

Primary Examiner—William A. Rivera
(74) Attorney, Agent, or Firm—Eric D. Levinson

(57) ABSTRACT

A tape reel assembly for a data storage tape cartridge including a hub, and first and second flanges. The hub defines a hub axis and opposing first and second ends from which the flanges extend, respectively. The first flange includes a radially extending main body and an adjustment section. The adjustment section is provided within the main body, defines a tape edge contact surface, and is characterized by an increased flexibility as compared to the main body. The tape edge contact surface is readily deflectable relative to the hub axis. The adjustment section is configured such that a deflection orientation of the tape edge contact surface is a function of pressure on the hub. During use, as pressure on the hub increases (e.g., tape winding pressure), the adjustment section positions the tape edge contact surface to desirably direct the wound tape to a consistent lateral position.

21 Claims, 6 Drawing Sheets

TAPE REEL ASSEMBLY WITH SELF-ADJUSTING FLANGE FOR A DATA STORAGE TAPE CARTRIDGE

BACKGROUND OF THE INVENTION

The present invention relates to a tape reel assembly for a data storage tape cartridge. More particularly, it relates to a tape reel assembly including a self-adjusting flange component configured to limit lateral movement of storage tape otherwise wound about the tape reel.

Data storage tape cartridges have been used for decades in the computer, audio, and video fields. The data storage tape cartridge continues to be an extremely popular device for recording large volumes of information for subsequent retrieval and use.

A data storage tape cartridge generally consists of an outer shell or housing maintaining at least one tape reel assembly and a length of magnetic storage tape. The storage tape is wrapped about a hub portion of the tape reel assembly and is driven through a defined tape path by a driving system. The housing normally includes a separate cover and base, the combination of which forms an opening (or window) at a forward portion thereof for allowing access to the storage tape by a read/write head of a tape drive. This interaction between storage tape and head may take place within the housing (for example, with a mid-tape load design), or the storage tape may be directed away from the housing to an adjacent area at which the read/write head is located (for example, with a helical drive design or a leader block design). Where the tape cartridge/drive system is designed to direct the storage tape away from the housing, the data storage tape cartridge normally includes a single tape reel assembly. Conversely, where the tape cartridge/drive system is designed to provide head/storage tape interaction within or very near the housing, a two- or dual-tape reel assembly configuration is typically employed.

Regardless of the number of tape reel assemblies associated with a particular data storage tape cartridge, the tape reel assembly itself is generally comprised of three basic components; namely, an upper flange, a lower flange, and a hub. The hub forms an outer, tape-winding surface about which the storage tape is wound. The flanges are disposed at opposite ends of the hub, and are spaced to approximate the height of the storage tape. To ensure that the storage tape does not undesirably contact one of the flanges during a winding operation, the designed flange-to-flange spacing is normally slightly greater than a height of the tape. As a point of reference, unexpected contact between a flange and an edge of the tape in a once around pattern will reflex a high frequency lateral movement back to the read/write head, possibly leading to servo-tracking errors. In this regard, tape reel flanges are typically injection molded plastic components. Though cost effective, this manufacturing technique invariably results in a small amount of flange warp. This warpage, in turn, renders consistent, precise flange-to-flange spacing difficult to achieve, especially at the outer edge of the flange. As such, a well-accepted design technique is to outwardly taper an inner surface of the flange (relative to radial extension from the hub upon final assembly), thereby providing an increasing flange-to-flange spacing from the hub to an outer edge of each flange. The designed taper virtually eliminates the possibility that any unexpected deviation in the flange orientation (due to warpage) will result in potentially detrimental contact between the flange and the lateral tape edge during winding.

While the above-described flange design has proven highly successful in eliminating undesirable flange-tape edge contact (and the resulting high frequency lateral movement problems described above), other concerns have been identified. In particular, as the storage tape is wound about the hub, consecutive wound layers of tape are relatively unstable due to several layers of tape floating on a layer of air. The storage tape generally settles in against one of the flanges as a result of the bipolar energy profile in the storage tape. The air slowly leaks out from the adjacent layers of tape, but until the adjacent layers come into contact with one another, the side-to-side energy in the tape path determines which flange the tape will ultimately settle against. The low mass storage tape can shift in the lateral direction very quickly while it is winding about the hub. In fact, the storage tape may shift back and forth between the inner surface profile of the upper and lower flanges (sometimes referred to as "pack shift"). Due to the tapered inner surface flange profile described above, then, the storage tape may experience a discernable lateral shift as additional tape is continuously wound onto the tape reel assembly.

Previously, the lateral storage tape displacement identified above was of minimal concern as the servo-track associated with the storage tape was sufficiently sized to account for expected lateral displacement. In general terms, the servo-track provides a baseline by which the read/write head can ascertain a "position" of the storage tape itself. The servo-track width has heretofore been sufficient to accommodate the lateral movement associated with the tapered inner surface flange design. However, evolution of tape cartridge/tape drive technology has resulted in increasingly smaller track widths for enhanced storage space, including the servo-track. The reduced-width servo-track has a limited frequency (or lateral displacement) response. Unfortunately, the above-described tapered flange-induced tape path deviations may entail a frequency well above the bandwidth of the now smaller sized servo-track. This, in turn, can lead to servo-tracking errors.

It may be possible to address the above concern by utilizing different materials for the tape reel flanges and/or a more precise manufacturing technique. However, this approach would greatly increase the overall costs of the cartridge itself, and is thus not a feasible solution from a manufacturing standpoint. Alternatively, a pack arm roller can be incorporated into the cartridge that serves to squeeze air out from between tape layers as the tape is being wound onto the tape reel. Unfortunately, current cartridge layouts do not provide sufficient space for a pack roller, and interaction with the pack roller may, in fact, contribute to lateral tape movement. Including a separate pack roller would increase overall cartridge costs. Similarly, it may be possible to incorporate a belt into the cartridge design that would otherwise contact the tape as it is being wound onto the tape reel assembly, again forcing air out from between layers of tape. The belt itself can, however, contribute to tape distortion, and again would overtly increase overall cartridge costs.

Data storage tape cartridges continue to be important tools used to store vast amounts of information. While improvements in storage tape media and read/write head technology have greatly increased the amount of data that can be stored by a particular cartridge, previously acceptable tapered flange-related lateral tape movement may no longer be tolerable. Therefore, a need exists for a tape reel assembly configured to control a lateral position of the storage tape as it is wound about the hub that does not grossly affect overall costs.

SUMMARY OF THE INVENTION

One aspect of the present invention relates to a tape reel assembly for a data storage tape cartridge. The tape reel assembly includes a hub, a first flange, and a second flange. The hub defines a hub axis, and opposing first and second ends. The first flange extends from the first end of the hub and includes a main body and an adjustment section. The main body extends radially from the hub. The adjustment section is provided within the main body. In this regard, the adjustment section defines a tape edge contact surface and is further characterized by an increased flexibility as compared to the main body. With this construction, the tape edge contact surface is readily deflectable relative to the hub axis. Along these same lines, the adjustment section is configured such that a deflection orientation of the tape edge contact surface is a function of a pressure on the hub. Finally, the second flange extends from the second end of the hub. During use, as pressure on the hub increases (e.g., due to an increased length of tape wrapped around the hub), the adjustment section will deflect. This deflection, in turn, positions the tape edge contact surface to desirably direct the storage tape, that is otherwise being wound about the hub, to a consistent lateral position relative to the hub axis. In one preferred embodiment, the adjustment section includes an elongated, tubular member extending from a fixed end, that is otherwise associated with the hub, to free end located opposite the hub.

Another aspect of the present invention relates to a data storage tape cartridge including a housing, at least one tape reel assembly, and a storage tape. The housing defines an enclosed region. The tape reel assembly is rotatably disposed within the enclosed region and includes a hub, a first flange, and a second flange. The hub defines a hub axis, a tape-receiving surface, and opposing first and second ends. The first flange extends from the first end of the hub and includes a main body and an adjustment section. The main body extends radially from the hub. The adjustment section is provided within the main body and defines a tape edge contact surface. Further, the adjustment section is characterized by an increased flexibility as compared to the main body, such that the tape edge contact surface is readily deflectable relative to the hub axis. The second flange extends from the second end of the hub. Finally, the storage tape is wound about the tape-receiving surface of the hub. With this construction in mind, winding of the storage tape about the hub imparts a winding pressure onto the hub itself. In this regard, the adjustment section is configured such that a deflection orientation of the tape edge contact surface is a function of the winding pressure. During use, as the winding pressure increases, the adjustment section will deflect to place the tape edge contact surface into contact with a lateral edge of the storage tape. Thus, a position of the storage tape relative to the hub axis is dictated by the adjustment section, as opposed to the main body. For example, and in one preferred embodiment, a radial extension of the main body from the hub defines a tape guide plane. With this construction, the adjustment section is configured such that with increased winding pressure, an area of the tape edge contact surface that is otherwise below the tape guide plane increases for contacting an edge of the storage tape. In another preferred embodiment, both of the first and second flanges include an adjustment section as described above.

Yet another aspect of the present invention relates to a data storage tape cartridge including a housing, at least one tape reel, and a storage tape. The housing defines an enclosed region. The tape reel is rotatably disposed within the enclosed region and includes a hub, a first flange, and a second flange. The hub defines a hub axis, a tape-receiving surface, and opposing first and second ends. The first flange extends from the first end of the hub and includes a main body and an adjustment section. The main body extends radially from the hub. The adjustment section is provided within the main body, and defines a tape edge contact surface. Further, the adjustment section is characterized by an increased flexibility as compared to the main body, such that the tape edge contact surface is readily deflectable relative to the hub axis. The second flange extends from the second end of the hub. Finally, the storage tape is wound about the tape-receiving surface of the hub. With this construction, the adjustment section is configured to gradually deflect inwardly relative to the hub axis as a length of the storage tape wound about the hub is increased, such that the tape edge contact surface contacts an edge of the tape and establishes a lateral spacing between the tape edge and at least a portion of the main body.

DETAILED DESCRIPTION OF THE PREFERRED EMBODIMENTS

Figure 1:
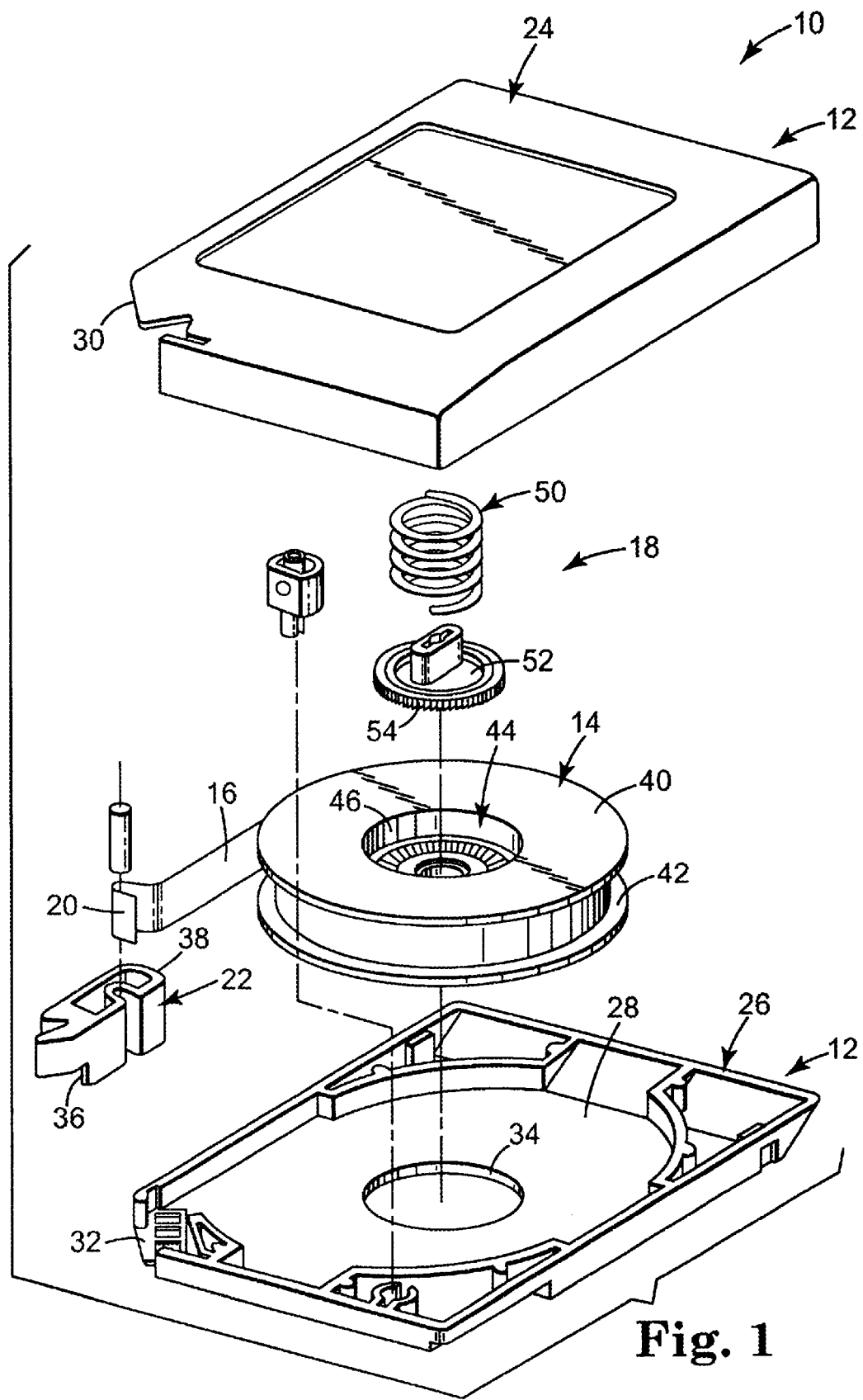
FIG. 1 is a perspective view of an exemplary data storage tape cartridge in accordance with the present invention.

The present invention relates to a tape reel assembly useful with a data storage tape cartridge. In this regard, an exemplary data storage tape cartridge 10 is shown in FIG. 1. Generally speaking, the data storage tape cartridge 10 includes a housing 12, at least one tape reel assembly 14, a storage tape 16, and a brake assembly 18. The tape reel assembly 14 is disposed within the housing 12. The storage tape 16, in turn, is wound about a portion of the tape reel assembly 14 and includes a free end 20 attached to a leader block 22. Finally, the brake assembly 18 is centrally positioned within a portion of the tape reel assembly 14, and is connected to a portion (not shown) of the housing 12. As a point of reference, the tape reel assembly 14 of the present invention is useful not only with the single reel-type data storage tape cartridge 10 shown in FIG. 1, but also with a dual-reel design that is otherwise known in the art.

The housing 12 is sized in accordance with industry-accepted tape drive form factors. Thus, the housing 12 can assume a form factor size of approximately 125 mm×110 mm×25 mm, although other form factors or dimensions are equally acceptable. With this in mind, the housing 12 is defined by a first housing section 24 and a second housing section 26. In one preferred embodiment, the first housing section 24 provides a cover, whereas the second housing section 26 serves as a base. It should be understood that as used throughout the specification, directional terminology, such as "cover", "base", "upper", "lower", "top", "bottom", etc., is used for purposes of illustration only, and is in no way limiting.

The first and second housing sections 24, 26 are configured to be reciprocally mated to one another to define an enclosure 28 (referenced generally in FIG. 1) for maintaining various other components of the data storage tape cartridge 10. With specific reference to the exemplary single reel design of FIG. 1, the housing 12 is preferably rectangular, except for one corner 30, which is angled and forms a leader block window 32. The leader block window 32 is configured to hold the leader block 22 and serves as an opening for the storage tape 16 to exit from the enclosure 28 such that the storage tape 16 can be threaded to a tape drive (not shown) when the leader block 22 is removed from the leader block window 32. Conversely, when the leader block 22 is snapped into the leader block window 32, the leader block window 32 is covered.

In addition to the leader block window 32, the second housing section 26 further forms an opening 34. The opening 34 facilitates access to the tape reel assembly 14 by a drive chuck portion of a tape drive (not shown). Conversely, the first housing section 24 includes a connector (not shown) extending from an inner face thereof. The connector is positioned opposite the opening 34 and is configured to retain a portion of the brake assembly 18. As is known to those of ordinary skill in the art, in one preferred embodiment, the connector is a tab sized to slidably receive a portion of the brake assembly 18. Alternatively, the connector may assume other forms known in the art, such as a series of teeth.

Leader blocks are also well known in the art. In one embodiment, a front surface of the leader block 20 includes a slot 36 for engaging an automatic threading apparatus of a reel-to-reel magnetic tape drive apparatus (not shown) and engages an inclined surface of the corner 30 of the housing 12. A rear surface 38 is rounded to form a portion of an arc of a radius to match the periphery of the take-up hub (not shown) in the tape drive apparatus as the leader block 22 fits into a slot in the take-up hub. Alternatively, other configurations known in the art for the leader block 22 are equally acceptable. Even further, depending upon a desired configuration of the data storage tape cartridge 10, the leader block 22 can be eliminated, such as with a dual-tape reel design.

The tape reel assembly 14 is described in greater detail below, and generally includes an upper flange 40, a lower flange 42, and a hub 44. The storage tape 16 is wound about the hub 44, constrained laterally by the flanges 40, 42. Further, the tape reel assembly 14 defines a central opening 46 sized to receive the brake assembly 18. Upon final assembly, the central opening 46 is generally axially aligned with the opening 34 and the housing 12.

The storage tape 16 is preferably a magnetic tape of a tape commonly known in the art. For example, the storage tape 16 can consist of a balanced polyethylene naphthalate (PEN)-based material coated on one side with a layer of magnetic material dispersed within a suitable binder system, and on the other side with a conductive material dispersed within a suitable binder system. Acceptable magnetic tape is available, for example, from Imation Corp., of Oakdale, Minn.

The brake assembly 18 is also known in the art, and preferably consists of a spring 50 and a brake body 52. The spring 50 is preferably a coil spring formed to bias the brake body 52 within the central opening 46 of the tape reel assembly 14. In this regard, the brake body 52 preferably includes a toothed surface 54 configured to engage a corresponding portion of the tape reel assembly in a "locked" position.

The tape reel assembly 14 is shown in greater detail in FIG. 2, and again includes the opposing flanges 40, 42, and the hub 44. The upper and lower flanges 40, 42 are secured to, and extend radially from, opposite ends of the hub 44.

Figure 2:
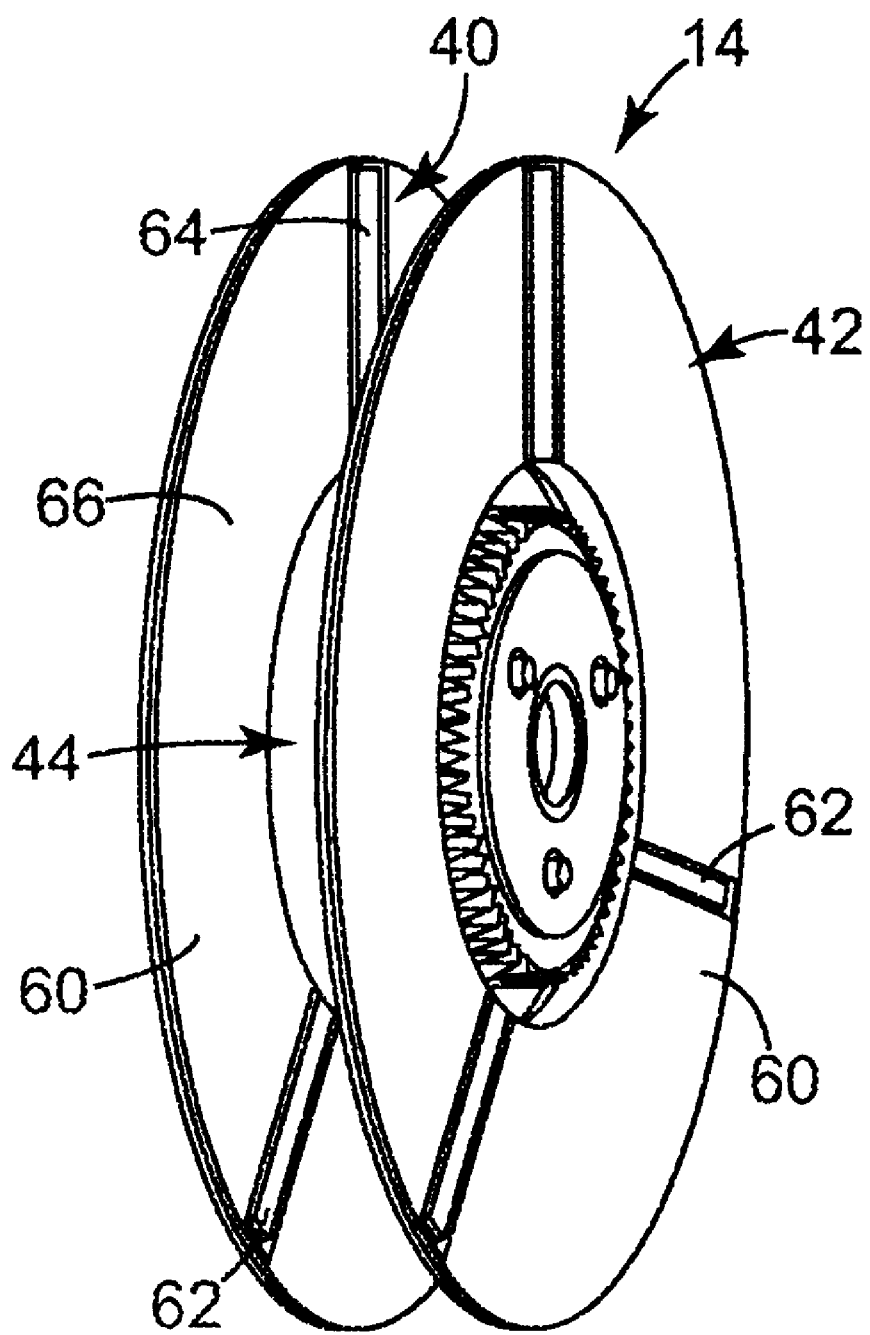
FIG. 2 is a perspective view of a tape reel assembly portion of the cartridge of FIG. 1.

The flanges 40, 42 each preferably include a main body 60 and an adjustment section 62. As described below, the adjustment section 62 can be formed apart from the main body 60 (e.g., as an extension of the hub 44, as part of a separate component assembled about the hub 44, etc.) or as an integral component of the respective flange 40, 42. Regardless, the adjustment section 62 is provided "within" the main body 60. In a preferred embodiment, three of the adjustment sections 62 are provided with each flange 40, 42, and each defines a tape edge contact surface 64 (best shown relative to the flange 40 in FIG. 2). Each adjustment section 62 is characterized as being more flexible than the corresponding main body 60, such that the tape edge contact surface 64 is readily deflectable relative to an inner tape guide surface or plane 66 provided by the main body 60 (best shown relative to the flange 40 in FIG. 2). While the tape reel assembly 14 is shown in FIG. 2 as providing three of the adjustment sections 62 for each of the flanges 40, 42, any other number is also acceptable. For example, each flange 40, 42 need only include one adjustment section 62. Preferably, however, where two or more of the adjustment sections 62 are provided, they are equidistantly spaced relative to a circumference of the hub 44. Further, the adjustment section 62 need only be provided within one of the flanges 40 or 42.

Figure 3:
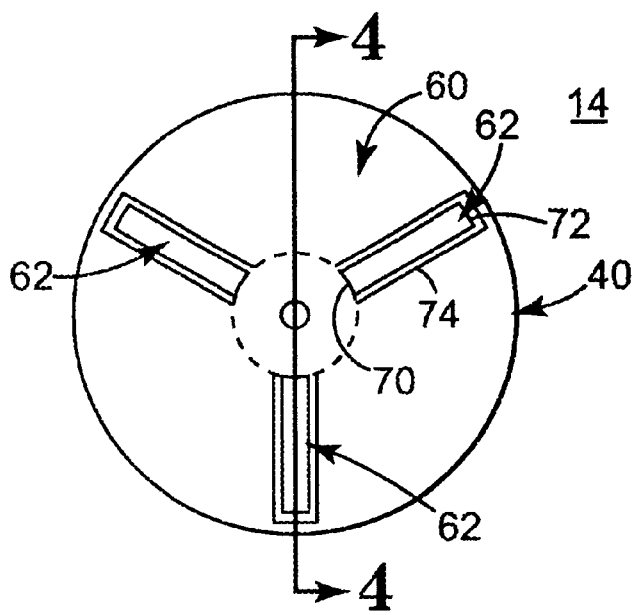
FIG. 3 is a top view of the tape reel assembly of FIG. 2.

In one preferred embodiment, and with additional reference to FIG. 3, the adjustment section 62 is an elongated body defining a fixed end 70 and a free end 72. The fixed end 70 is preferably secured to the main body 60 adjacent the hub 44. The free end 72 is positioned opposite the hub 44 and is not otherwise directly attached to the main body 60. To this end, the main body 60 preferably forms an aperture or cut-out 74 within which the preferred adjustment section 62 extends. With this one preferred configuration, then, the adjustment section 62 freely deflects relative to the main body 60, pivoting at the fixed end 70.

Figure 4:
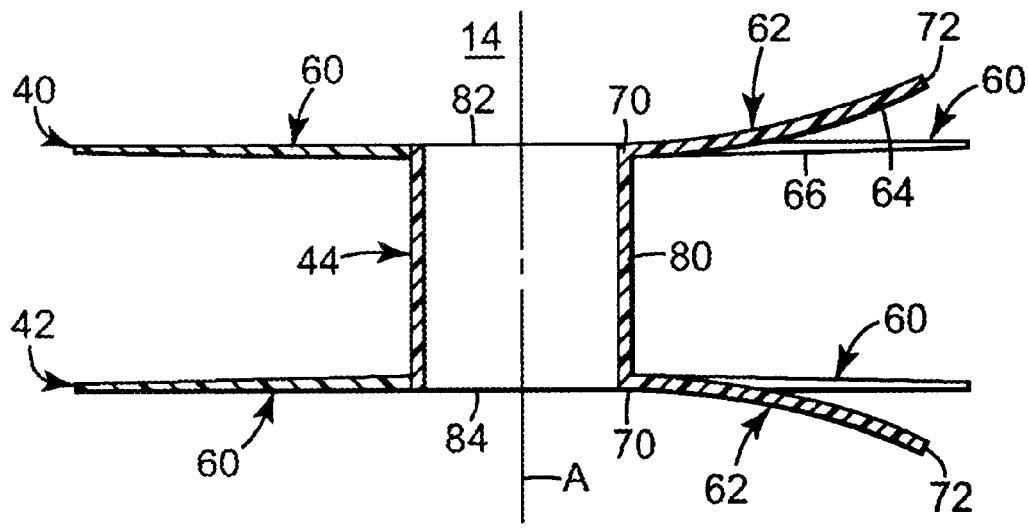
FIG. 4 is an enlarged, cross-sectional view of the tape reel assembly of FIG. 3 taken along the line 4—4.

The above-described construction of the flange 40 or 42 directly connects the adjustment section 62 with the hub 44 via the fixed end 70. In this way, a deflection orientation of the adjustment section 62 is related to, or is a function of, a pressure on the hub 44. With reference to FIG. 4, the hub 44 defines a tape-receiving surface 80, a first end 82, and a second end 84. As a point of reference, the deflection orientation of the adjustment sections 62 is exaggerated in FIG. 4 for purposes of illustration. That is to say, in a preferred embodiment, the adjustment sections 62 will outwardly curve to a much lesser extent than otherwise reflected in FIG. 4. For example, the natural orientation of the adjustment sections 62 can be such that the free end 72 projects only slightly away from the inner guide surface 66 of corresponding main body 60.

With the above explanation in mind, the flanges 40, 42 extend from the first and second ends 82, 84, respectively.

The storage tape 16 (FIG. 1) is wound about the tape-receiving surface 80. In this regard, winding of the storage tape 16 imparts a winding pressure onto the hub 44 via the tape-receiving surface 80. This tape winding pressure, in turn, is translated or transferred to the adjustment section 62 via the fixed end 70. More particularly, the tape winding pressure level dictates the deflection orientation of the adjustment section 62; as the tape winding pressure increases (i.e., with an increased length of the storage tape 16 being wrapped about the hub 44), the adjustment section 62, and in particular the tape edge contact surface 64, experiences an increased inward deflection relative to a central axis A defined by the hub 44. Notably, the preferred relationship between the hub tape winding pressure and the adjustment section 62 deflection orientation can be achieved with other configurations. For example, the adjustment section 62 need not be connected to the main body 60; instead, the adjustment section 62 can be formed at a direct extension of the hub 44. Even further, the adjustment section 62 can be integrally formed with the main body 60 as a differing material and/or thickness, such as via a shim-stock technique. With this alternative configuration, only a portion of the adjustment section 62, but including the tape edge contact surface 64, will readily deflect relative to the main body 60. Regardless, the adjustment section 62 is configured such that a position of the tape edge contact surface 64 is a function of the tape winding pressure on the hub 44, and thus correlates with the amount or length of the storage tape 16 wrapped about the hub 44.

Figure 5A:
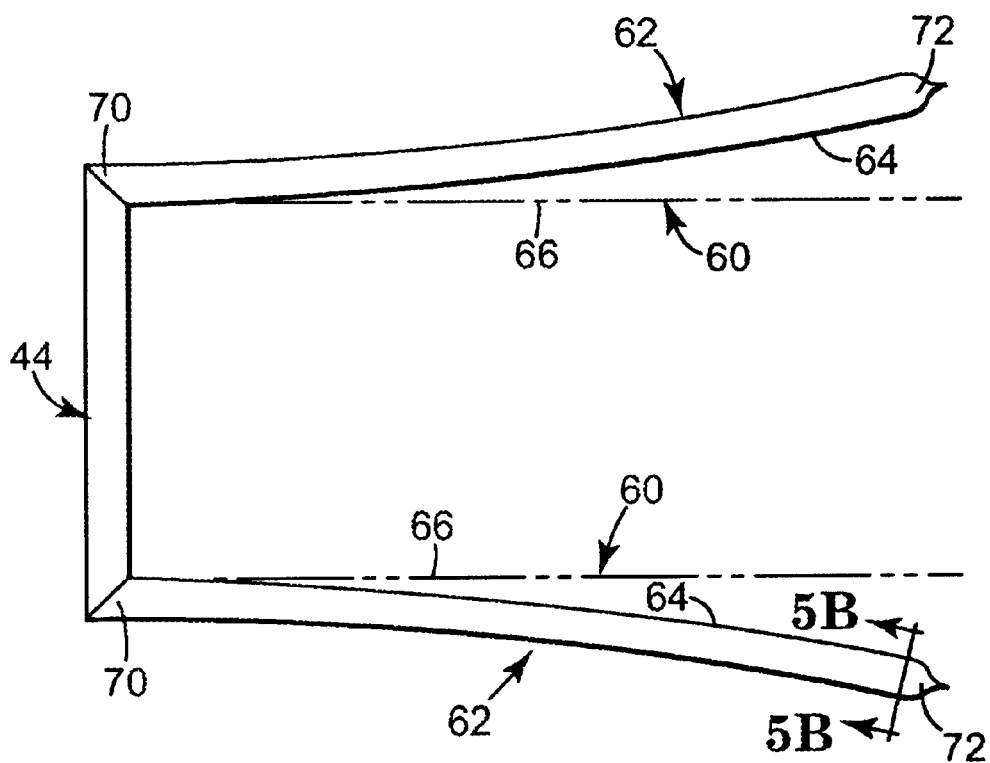
FIG. 5A is an enlarged, schematically side view of a portion of a preferred embodiment tape reel assembly.
Figure 5B:
FIG. 5B is a cross-sectional view of a portion of FIG. 5A taken along the line 5B—5B.

In one preferred embodiment, the desired deflectable characteristic of the adjustment section 62 is achieved by forming the adjustment section 62 as a sealed tube as shown in FIG. 5A. In an even more preferred embodiment, the sealed tube is elliptical in cross-section, as shown in FIG. 5B. With this one preferred construction, the adjustment section 62 naturally assumes an outwardly curved profile, relative to the main body 60 (when the hub 44 is unloaded or otherwise has a minimal amount of the storage tape 16 wrapped about the tape receiving surface 80). In particular, relative to the plane defined by the tape guide surface 66 (referenced generally in FIG. 5A) of the main body 60, extension of the adjustment section 62 in the unloaded state projects, preferably curves, axially outwardly from the fixed end 70 to the free end 72. Thus, in the unloaded state, the adjustment section 62 is oriented such that the tape edge contact surface 64 is positioned above or outwardly away from the tape guide surface 66 otherwise defined by the main body 60.

Figure 6A:
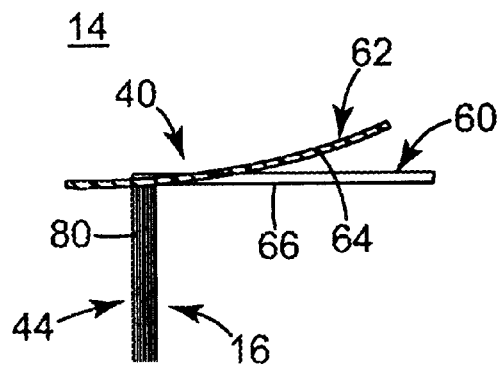
FIGS. 6A–6C are enlarged, cross-sectional views of a portion of the tape reel assembly of FIG. 2 illustrating deflection of an adjustment section as storage tape is wound about a tape reel assembly.
Figure 6B:
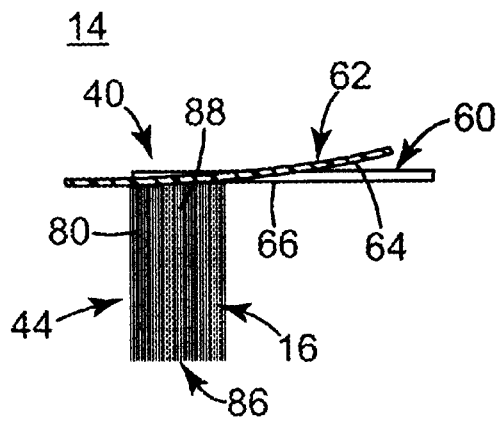
Figure 6C:
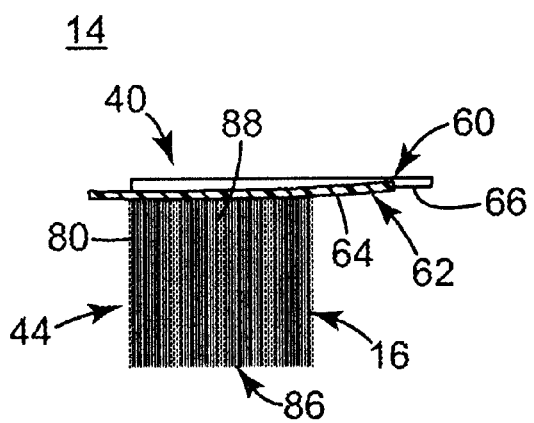

Deflection of the adjustment section 62 is best illustrated in FIGS. 6A–6C. As a point of reference, each of FIGS. 6A–6C schematically depicts a portion of the tape reel assembly 14, including a portion of the flange 40 and the hub 44. In particular, one of the adjustment sections 62 of the flange 40 is shown in conjunction with a corresponding portion of the main body 60, including the tape guide surface 66. Further, the tape winding surface 80 of the hub 44 is also shown. Finally, an outward extension of the adjustment section 62 relative to the main body 60 has been exaggerated in FIGS. 6A–6C for purposes of illustration. With this in mind, FIGS. 6A–6C reflect transition or deflection of the adjustment section 62 as the storage tape 16 is wound about the hub 44. To this end, FIG. 6A reflects an essentially "empty" hub (i.e., only a few layers of the storage tape 16 wrapped about the hub 44); FIG. 6B reflects the tape reel assembly 14 being one-third loaded (or one-third full) with the storage tape 16; and FIG. 6C illustrates the tape reel assembly 14 being two-thirds loaded (or two-thirds full) with the storage tape 16.

With the above designations in mind, when there is little or no storage tape 16 wrapped about the hub 44 (FIG. 6A), the adjustment section 62 assumes a natural or un-deflected position in which a majority of the tape edge contact surface 64 projects outwardly or above (relative to the orientation of FIG. 6A) a plane defined by the tape guide surface 66 of the main body 60. That is to say, little or no winding pressure is exerted on the hub 44, such that the adjustment section 62 is not caused to deflect from a natural orientation.

As an additional length of the storage tape 16 is wound about the hub 44 (FIG. 6B), a winding pressure is imparted onto the hub 44. This winding pressure, in turn, is transferred or translated to the adjustment section 62, causing the adjustment section 62 to deflect. More particular, as shown in FIG. 6B, a portion of the tape edge contact surface 64 deflects axially inwardly or downwardly (relative to the orientation of FIG. 6B), positioning a lateral edge of the storage tape 16. As a point of reference, as the storage tape 16 is wound about the hub 44, consecutive wound layers of the storage tape 16 combine to define a tape pack that is otherwise referenced as element 86 in the figures. The tape pack 86 defines opposing lateral edges 88 (one of which is shown in FIGS. 6B and 6C). The tape edge contact surface 64 of the adjustment section 62 deflects to an orientation or position whereby the surface 64 contacts the lateral edge 88, directing the tape pack 86 to a desired axial or lateral position relative to the hub 44. Notably, an axial position of the lateral edge 88, as otherwise dictated by the adjustment section 62, is spaced from the tape guide surface 66 of the main body 60 with an increasing radial width of the tape pack 86. It will be recalled that the tape guide surface 66 of the main body 60 preferably tapers axially outwardly (or upwardly relative to the orientations of FIGS. 6A–6C) as it extends radially from the hub 44. Thus, the deflection orientation of the adjustment section 62 in FIG. 6B dictates a spacing between the lateral edge 88 of the tape pack 86 relative to the tape guide surface 66 as the tape pack 86 increases in radial width (i.e., with increased length of the storage tape 16 otherwise wrapped about the hub 44).

This spaced relationship continues with additional storage tape 16 being wrapped about the hub 44 as shown in FIG. 6C. Once again, the adjustment section 62 is configured such that a deflection orientation thereof is based upon, or is a function of, the tape winding pressure on the hub 44 (that in turn increases or decreases depending upon the amount or length of the storage tape 16 wrapped about the hub 44). Additionally, as a rotational speed of the tape reel assembly 14 is increased (indicative of a winding operation), inward deflection of the adjustment section 62 will likewise preferably increase (although not necessarily). Thus, as the length of the storage tape 16 wrapped about the hub 44 increases, the adjustment section 62, and in particular the tape edge contact surface 64, ensures a relatively uniform position of the tape edge 88 across the tape pack 86. More particularly, the adjustment section 62 prevents the tape edge 88 from "following" a taper of the tape guide surface 66. Notably, the adjustment section 62 is able to accomplish this desired positioning of the tape pack 86 with very little force, as consecutive layers of the storage tape 16 otherwise wound about the hub 44 are essentially floating on a layer of air, and thus are readily guided via contact within the tape edge contact surface 64.

In a preferred embodiment, the adjustment section 62 serves to substantially center the tape pack 86 relative to a height of the hub 44. However, so long as the adjustment section 62 prevents the lateral edge 88 of the tape pack 86 from overtly shifting between the inner surfaces 66 of the flange bodies 60, a major cause of lateral winding displacement is eliminated.

Figure 7:
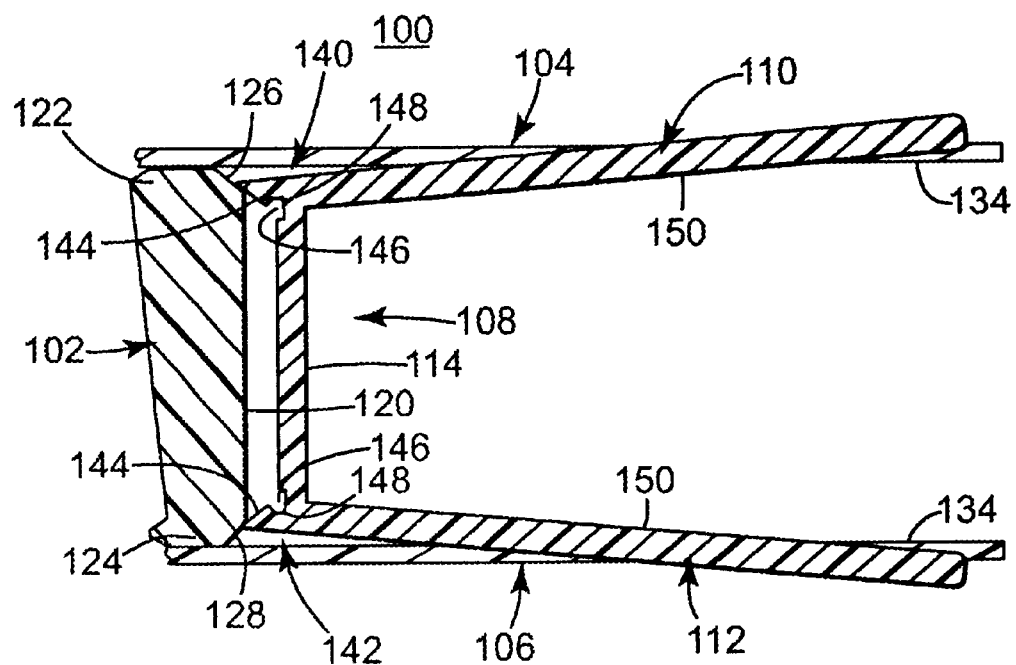
FIG. 7 is an enlarged, cross-sectional view of a portion of an alternative embodiment tape reel assembly in accordance with the present invention.

A portion of an alternative embodiment tape reel assembly 100 is provided in FIG. 7. The tape reel assembly 100 includes a hub 102, an upper flange 104, a lower flange 106, and a guide component 108. The guide component 108 is formed separate from the hub 102 and the flanges 104, 106, and includes an upper adjustment section 110 and a lower adjustment section 112 that are connected by a cross member 114. In general terms, the upper adjustment section 110 extends within the upper flange 104, whereas the lower adjustment section 112 extends within the lower flange 106 (the outward extension of the adjustment sections 110, 112 relative to the corresponding flange 104, 106 being exaggerated in the view of FIG. 7 for purposes of illustration). During use, the storage tape 16 (FIG. 1) is wound about the hub 102 and the cross member 114. A winding pressure of the storage tape 16 forces the cross member 114 toward the hub 102 (to the left relative to the orientation of FIG. 7). This movement, in turn, causes each of the upper and lower adjustment sections 110, 112 to deflect axially inwardly relative to the upper and lower flanges 104, 106, respectively. The now deflected adjustment sections 110, 112, in turn, contact respective lateral edges of the storage tape 16 to achieve the desired axial or lateral position of the storage tape pack (not shown, but referenced generally at 86 in FIGS. 6B and 6C) relative to the hub 102 as previously described.

The hub 102 is similar to previous embodiments, and defines a tape-receiving surface 120, a first end 122, and a second end 124. In addition, the hub 102 forms opposing tapered surfaces 126, 128 between the tape receiving surface 120 and the first and second ends 122, 124, respectively. As described below, the tapered surfaces 126, 128 are configured to slidably receive corresponding portions of the guide component 108 to facilitate deflection of the adjustment sections 110, 112 during a tape winding operation.

The upper and lower flanges 104, 106 are highly similar to previous embodiments, and define a main body having one or more cut-outs (shown generally in FIG. 7) within which a corresponding adjustment section 110, 112 extends. As with previous embodiments, the flanges 104, 106 each define an inner, tape guide surface 134.

The guide component 108 is formed separate from the hub 102 and the flanges 104, 106, and is preferably a thickened metal. In addition to the adjustment sections 110, 112, and the cross member 114, the guide component 108 preferably further includes upper and lower deflection members 140, 142 extending radially inwardly from the adjustment sections 110, 112, respectively. In this regard, each of the deflection members 140, 142 define an engagement surface 144 and a recess 146 that otherwise establishes a pivot point 148. Finally, as with previous embodiments, each of the adjustment sections 110, 112 defines a tape edge contact surface 150. The engagement surface 144 is configured to slidably contact the corresponding tapered surface 126 or 128 provided by the hub 102. In this regard, a taper or angle defined by the engagement surface 144 is preferably different than an angled defined by the tapered surfaces 126, 128 (upon final assembly). As described in greater detail below, a tape winding pressure imparted onto the cross-member 114 forces the engagement surfaces 144 to slide along the corresponding tapered surface 126 or 128. This action, in turn, causes the respective adjustment section 110 or 112 to deflect inwardly, with this deflection being localized at the respective pivot point 148.

In a preferred embodiment, the cross-member 114 is relatively small in terms of thickness and width so as to minimally impact the storage tape 16 (FIG. 1) as it is wrapped about the hub 102. That is to say, the cross member 114 does not encompass an entire circumference of the hub 102, but is instead of a width corresponding with a width of the adjustment sections 110, 112. Further, the guide component 108 preferably provides a plurality of adjustment sections 110 and 112 (e.g., three equidistantly spaced upper adjustment sections 110 and three equidistantly spaced lower adjustment sections 112), with a separate cross member 114 being provided for each corresponding pair of upper and lower adjustment sections 110, 112. With this one preferred construction, then, the guide component 108 can be formed separate from the hub 102, and subsequently assembled to the position shown in FIG. 7.

During use, and as previously described, when the tape reel assembly 100 is "empty" (i.e., little or no storage tape 16 (FIG. 1) wrapped about the hub 102), the guide component 108, and in particular the upper and lower adjustment sections 110, 112, assume the orientation shown in FIG. 7 whereby the tape edge contact surfaces 150 extend axially outwardly relative to a plane of the tape guide surfaces 134 the upper and lower flanges 104, 106, respectively. During a tape winding operation, the storage tape 16 is wrapped about the hub 102 and the cross member 114. This places a winding pressure on the cross member 114, causing the cross member 114 to move toward the tape-receiving surface 120 of the hub 102 (to the left relative to the orientation of FIG. 7). As the cross member 114 moves toward the tape-receiving surface 120, the engagement surfaces 144 contact and slide along the tapered surfaces 126, 128, respectively, of the hub 102. Thus, the tapered surfaces 126, 128 serve to direct the engagement surfaces 144 axially outwardly. Outward deflection of the deflection members 140, 142, in turn, causes the adjustment sections 110, 112 to deflect at the respective pivot point 148, such that the respective tape edge contact surfaces 150 deflect axially inwardly relative to the respective flange 104 or 106. Thus, the tape edge contact surfaces 150 deflects to an orientation or position whereby the surfaces 150 contact a corresponding lateral edge (not shown) of the storage tape to a desired axial or lateral position relative to the hub 102 (similar to the action described with respect to FIGS. 6A–6C). Thus, as with previous embodiments, the deflection orientation of the adjustment sections 110, 112 is a function of the tape winding pressure (or length of the storage tape 16 wrapped about the hub 102).

Figure 8:
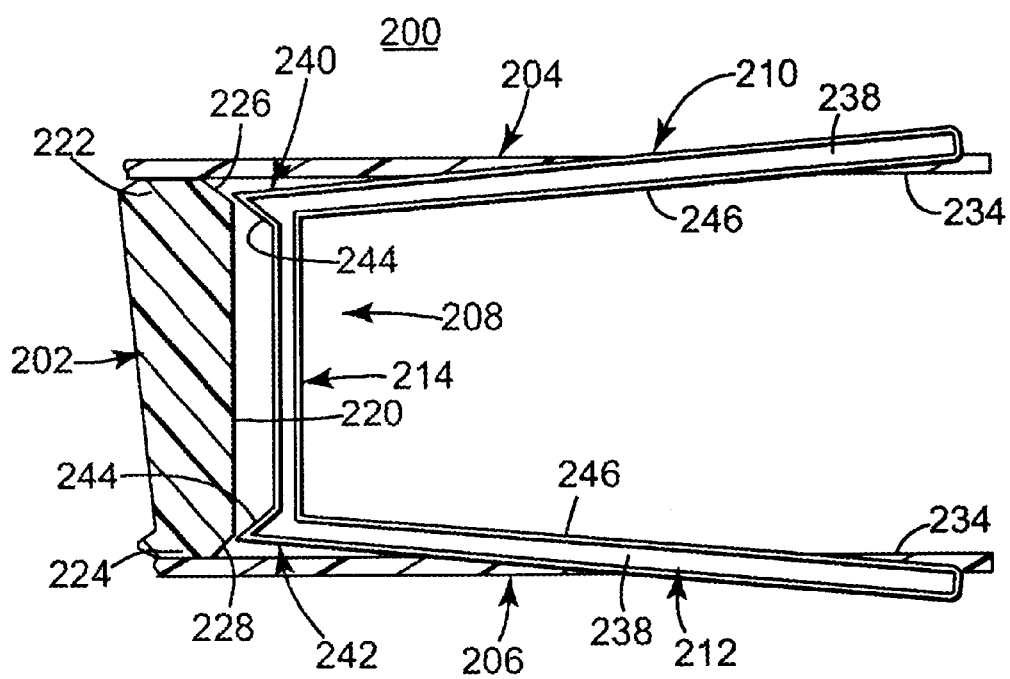
FIG. 8 is an enlarged, cross-sectional view of a portion of an alternative embodiment tape reel assembly in accordance with the present invention.

A portion of yet another alternative embodiment tape reel assembly 200 is shown in FIG. 8. The tape reel assembly 200 is highly similar to the tape reel assembly 100 previously described with respect to FIG. 7, and includes a hub 202, an upper flange 204, a lower flange 206, and a guide component 208. Further, the guide component 208 includes an upper adjustment section 210, a lower adjustment section 212, and a cross member 214 connecting the sections 210, 212. Once again, an outward extension of the adjustment sections 210, 212 relative to the corresponding flange 204, 206 is exaggerated in FIG. 8 for purposes of illustration. As described in greater detail below, the guide component 208 differs from the guide component 108 previously described with respect to FIG. 7 in that the guide component 208 is hollow such that the adjustment sections 210, 212 exhibit a non-uniform deflection. Nonetheless, and similar to the tape reel assembly 100 (FIG. 7), during use, a tape winding pressure placed on the cross-member 214 causes the upper and lower adjustment sections 210, 212 to deflect axially inwardly relative to the flanges 204, 206, respectively, for achieving desired axial or lateral position of a wound storage tape 16 (FIG. 1) relative to the hub 202.

The hub 202 is virtually identical to the hub 102 (FIG. 7) previously described, and defines a tape-receiving surface 220, a first end 222, a second end 224. Further, opposing tapered surfaces 226, 228 are defined between the tape-receiving surface 220, and the first and second ends 222, 224, respectively. Similarly, the upper and lower flanges 204, 206 are virtually identical to previous embodiments, and define cut-outs (shown generally in FIG. 8) and inner, tape guide surfaces 234.

Finally, the guide component 208 is formed separate from the hub 202 and the flanges 204, 206, as preferably a thin metal material formed to define a hollow interior 238. In addition to the adjustment sections 210, 212 and the cross member 214, the guide component 208 includes deflection members 240, 242 extending radially inwardly from a respective one of the adjustment sections 210, 212. In this regard, the deflection members 240, 242 each define an engagement surface 244 configured to slidably engage a respective one of the tapered surfaces 226, 228 of the hub 202. Once again, the cross member 214 is highly thin and has a width corresponding with a width of the adjustment sections 210, 212. Further, in a preferred embodiment, a plurality of equidistantly spaced upper and lower adjustment sections 210, 212 pairs are provided, with each pair being connected by a separate one of the cross members 214. The preferred hollow construction of the guide component 208 facilitates desired deflection of the adjustment sections 210, 212 during a tape winding operation. That is to say, a "squeezing" pressure on the cross-member 214 causes the adjustment sections 210, 212 to deflect inwardly. In this regard, each of the adjustment sections 210, 212 defines a tape edge contact surface 246.

During use, when the tape reel assembly 200 is "empty", the guide component 208, and in particular the upper and lower adjustment sections 210, 212, assume the orientation shown in FIG. 8 whereby the tape edge contact surfaces 246 extend axially outwardly relative to the upper and lower flanges 204, 206, respectively. As the storage tape 16 (FIG. 1) is wrapped about the hub 202 and the cross member 214, a resulting winding pressure forces the cross member 214 toward the tape-receiving surface 220 of the hub 202 (to the left relative to the orientation of FIG. 8). Due to the hollow construction of the guide component 208, the winding pressure on the cross member 214 causes the adjustment sections 210, 212 to deflect axially inwardly (relative to an axis of the hub 202). Further, in conjunction with the movement of the cross member 214, the engagement surfaces 244 slide along the corresponding tapered surface 226, 228. The hollow nature of the guide component 208 causes the upper and lower adjustment sections 210, 212 to deflect in response to this sliding contact. In particular, an outer edge of each of the adjustment sections 210, 212 will curl or roll outwardly, whereas a more interior area of the adjustment sections 210, 212 will deflect axially inwardly. Thus, the respective tape edge contact surfaces 246 are positioned within the corresponding flange 204, 206, similar to the relationship described in FIGS. 6A–6C. As a length of the storage tape 16 otherwise wrapped about the hub 202 increases, the inward deflection of the adjustment sections 210, 212 increases along a length of the adjustment section 210, 212, such that the tape edge contact surfaces 246 contact a corresponding lateral edge (not shown) of the wound storage tape 16, directing that lateral edge to a desired axial or lateral position relative to the hub 202.

The tape reel assembly of the present invention provides a marked improvement over previous designs. By incorporating an adjustment section into one or both of the flanges, a uniform lateral tape pack position can be achieved. Thus, the servo-tracking errors otherwise exhibited with "standard" tape reel assemblies whereby the storage tape pack shifts between flanges is eliminated. In this regard, deflection orientation of the adjustment section(s), and in particular the tape edge contact surface, is controlled by the winding pressure on the hub or length of tape wrapped about the hub, as well as a rotational speed of the tape reel assembly in the preferred embodiment. The preferred adjustment section design does not occupy additional cartridge space, and is relatively inexpensive. Further, the preferred adjustment section does not adversely impact a circumference of the hub or related flange, and thus will not create cinching problems.

Although the present invention has been described with reference to preferred embodiments, workers skilled in the art will recognize that changes can be made in form and detail without departing from the spirit and scope of the present invention. For example, the tape reel assembly has been preferably described as being utilized within a single reel cartridge. Alternatively, the tape reel assembly of the present invention can be provided as part of a dual-cartridge design in which one or both of the tape reel assemblies are configured in accordance with the present invention. Further, while the tape reel assembly has been preferably described as including one or more of the adjustment sections on both of the upper and lower flanges, the lateral tape positioning provided by the present invention can be achieved with only one of the flanges (either the upper or lower flange) conforming with the present invention.

What is claimed is:

1. A tape reel assembly for a data storage tape cartridge, the tape reel comprising:

a hub defining a hub axis, opposing first and second ends, and a uniform tape-receiving surface;

a first flange extending radially from the first end of the hub, at least a portion of the first flange defining a tape edge contact surface and being readily detectable relative to the hub axis and configured such that a deflection orientation of the tape edge contact surface is directly related to a pressure on the tap-receiving surface; and a second flange extending from the second end of the hub.

2. The tape reel assembly of claim 1, wherein the first flange includes an adjustment section having an elongated member extending from a fixed end positioned adjacent the hub to a free end positioned opposite the hub.

3. The tape reel assembly of claim 2, wherein the main body forms an aperture within which the elongated member extends.

4. The tape reel assembly of claim 3, wherein the fixed end is connected to the hub via the main body.

5. The tape reel assembly of claim 2, wherein the fixed end is connected to the hub.

6. The tape reel assembly of claim 2, wherein the elongated member is a tube.

7. The tape reel assembly of claim 6, wherein the elongated member is elliptical in transverse cross-section.

8. The tape reel assembly of claim 1, further comprising:

a guide component formed separate from the hub and including the adjustment section.

9. The tape reel assembly of claim 1, wherein the first flange includes a plurality of adjustment sections.

10. The tape reel assembly of claim 1, wherein the second flange includes:
   a main body extending radially from the hub; and
   an adjustment section provided within the main body of the second flange, the adjustment section of the second flange defining a tape edge contact surface and characterized by an increased flexibility as compared to the main body of the second flange such that the tape edge contact surface of the second flange is readily deflectable relative to the hub axis;
   wherein the adjustment section of the second flange is configured such that a deflection orientation of the tape edge contact surface of the second flange is a function of a pressure on the hub.

11. The tape reel assembly of claim 1, wherein the tape-receiving surface is characterized by the absence of a cut out.

12. A data storage tape cartridge comprising:
   a housing defining an enclosed region;
   at least one tape reel assembly rotatably disposed within the enclosed region and including:
      a hub defining a hub axis, a uniform tape-receiving surface, and opposing first and second ends,
      a first flange extending radially from the first end of the hub, at least a portion of the first flange defining a tape edge contact surface and being readily deflectable relative to the hub axis,
      a second flange extending from the second end of the hub; and
   a storage tape wound about the tape-receiving surface of the hub;
   wherein winding of the storage tape imparts a winding pressure onto the tape-receiving surface, and further wherein the first flange is configured such that a deflection orientation of the tape edge contact surface is directly related to the winding pressure.

13. The data storage tape cartridge of claim 12, wherein a tape guide plane is defined perpendicular to the first end of the hub, and further wherein the first flange is configured such that with increased winding pressure, an area of the tape edge contact surface deflecting below the tape guide plane increases for contacting an edge of the storage tape.

14. The data storage tape cartridge of claim 12, wherein the first flange includes an adjustment section as an elongated member extending from a fixed end positioned adjacent the hub to a free end positioned opposite the hub.

15. The data storage tape cartridge of claim 14, wherein the fixed end is connected to the hub.

16. The data storage tape cartridge of claim 14, wherein the main body forms an aperture within which the elongated member extends.

17. The data storage tape cartridge of claim 14, wherein the elongated member is a tube.

18. The data storage tape cartridge of claim 17, wherein the elongated member is elliptical in transverse cross-section.

19. The data storage tape cartridge of claim 12, wherein the second flange includes:
   a main body extending radially from the hub; and
   an adjustment section provided within the main body of the second flange, the adjustment section of the second flange defining a tape edge contact surface and characterized by an increased flexibility as compared to the main body of the second flange such that the tape edge contact surface of the second flange is readily deflectable relative to the hub axis;
   wherein the adjustment section of the second flange is configured such that a deflection orientation of the tape edge contact surface of the second flange is a function of a pressure on the hub.

20. A data storage tape cartridge comprising:
   a housing defining an enclosed region;
   at least one tape reel rotatably disposed within the enclosed region, the tape reel including:
      a hub defining a hub axis, a uniform tape-receiving surface, and opposing first and second ends,
      a first flange extending radially from the first end of the hub, at least a portion of the first flange defining a tape edge contact surface and being readily deflectable relative to the hub axis,
      a second flange extending from the second end of the hub; and
   a storage tape wound about the tape-receiving suface of the hub;
   wherein the at least the portion of the first flange is configured to gradually deflect inwardly relative to the hub axis with an increased length of the storage tape being wound about the tape-receiving surface such that the tape edge contact surface contacts an edge of the tape.

21. The data storage tape cartridge of claim 20, wherein a tape guide plane is defined perpendicular to the first end of the hub, and further wherein the first flange is configured to transition from a first orientation in which a majority of the tape edge contact surface is above the tape guide plane to a second orientation in which a majority of the tape edge contact surface is below the tape guide plane with an increased length of the storage tape being wound about the tape-receiving surface.

* * * * *